United States Patent
Toda et al.

(10) Patent No.: US 6,504,265 B2
(45) Date of Patent: Jan. 7, 2003

(54) AUTOLEVELING DEVICE OF HEADLAMP FOR AUTOMOBILE

(75) Inventors: Atsushi Toda, Shizuoka (JP); Hideaki Takeuchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/755,559

(22) Filed: Jan. 5, 2001

(65) Prior Publication Data

US 2001/0019225 A1 Sep. 6, 2001

(30) Foreign Application Priority Data

Jan. 11, 2000 (JP) ........................................ 2000-002286

(51) Int. Cl.$^7$ ............................................. B60Q 1/115
(52) U.S. Cl. ........................................ 307/10.8; 315/79
(58) Field of Search ................................ 307/9.1, 10.1, 307/10.8; 315/79, 82; 362/460, 466, 467; 701/49

(56) References Cited

U.S. PATENT DOCUMENTS

| | | | |
|---|---|---|---|
| 4,733,333 A | * 3/1988 | Shibata et al. | ............... 362/346 |
| 5,787,370 A | * 7/1998 | Kutscher et al. | ............ 307/10.8 |
| 5,877,680 A | * 3/1999 | Okuchi et al. | ............... 362/464 |
| 5,907,196 A | 5/1999 | Hayami et al. | ............. 307/10.8 |
| 6,193,398 B1 | * 2/2001 | Okuchi et al. | ............... 362/464 |
| 6,321,176 B1 | * 11/2001 | Mitsumoto | ................... 362/459 |
| 6,445,085 B1 | * 9/2002 | Toda et al. | ................. 307/10.8 |

FOREIGN PATENT DOCUMENTS

| | | | | |
|---|---|---|---|---|
| EP | 0545111 A2 | * 6/1993 | ........... | B60Q/1/076 |
| GB | 2309773 A | 8/1997 | ........... | B60Q/1/115 |
| GB | 2309774 A | 8/1997 | ........... | B60Q/1/115 |
| GB | 2325757 A | 12/1998 | ........... | B60Q/1/115 |
| JP | 59195442 | 11/1984 | ............ | B60Q/1/10 |

* cited by examiner

*Primary Examiner*—Fritz Fleming
(74) *Attorney, Agent, or Firm*—Fish & Richardson P.C.

(57) ABSTRACT

An autoleveling device comprises a pair of left and right headlamps in which optical axes L are tilted in a vertical direction with respect to a body by driving operations of respective motors 10 (10L, 10R), single control means 16 for controlling the driving operations of the left and right motors 10 at the same time, a vehicle speed sensor 12, a height sensor 14 and a storage section 20 for storing pitch angle data detected by the height sensor 14, the control means 16 controlling the respective motors 10 such that the respective optical axes L have a predetermined inclination with respect to a road based on the pitch angle data thus detected, wherein the motors are driven only if a difference between the detected pitch angle and the pitch angle used for the last driving control of the motor is equal to or more than a predetermined reference value which is more than a pitch angle equivalent to a hysteresis width of each of the left and right motor driving circuits ($|\theta 2-\theta 1|>\theta 0$). Consequently, there is no drawback that only one of the motors is driven, and both motors are always driven at the same time. Therefore, the optical axes of the left and right headlamps are always held in the same positions in a vertical direction so that a constant visibility can be guaranteed.

6 Claims, 7 Drawing Sheets

AUTOLEVELING DEVICE OF HEADLAMP FOR AUTOMOBILE

BACKGROUND OF THE INVENTION

The present invention relates to an autoleveling device of a headlamp for an automobile which serves to automatically adjust tilting (hereinafter referred to as autoleveling) for an optical axis of the headlamp in a direction of off set equivalent to tilting in a longitudinal direction of a vehicle (hereinafter referred to as a pitch angle) based on the pitch angle, and more particularly to an autoleveling device for automatically adjusting the optical axis of the headlamp vertically based on the pitch angle of the vehicle mainly during stop.

In a headlamp of this kind, for example, a reflector having a light source inserted therein is supported to be tilted around a horizontal tilting axis with respect to a lamp body and an optical axis of the reflector (headlamp) can be tilted around the horizontal tilting axis by an actuator.

In a conventional autoleveling device, a vehicle is provided with pitch angle detecting means, a vehicle speed sensor, a control section for controlling the driving operation of the actuator based on a detection signal therefrom and the like, and an optical axis of a headlamp (reflector) is adjusted to be always set in a constant state with respect to a road.

In the conventional autoleveling device, however, leveling is carried out in real time for a change in a vehicle posture which is caused by acceleration and deceleration during running and a change in a load which is caused by loading and unloading a luggage or causing an occupant to get in and off during the stop irrespective of the running and stop of the vehicle. For this reason, the number of operations of the actuation is very large and power consumption is great. Furthermore, a great deal of durability is required for driving mechanism components such as a motor or a gear. Thus, a cost is increased.

In order to provide an inexpensive autoleveling device which has the driving frequency of an actuator reduced and can be used for a long period of time, therefore, there has been proposed an autoleveling device (Japanese Patent Application No. Hei 10-274859) in which the driving operation of an actuator is controlled at a constant interval (10 seconds) during stop.

In the autoleveling device thus proposed, the driving operations of the actuators of a pair of left and right headlamps are controlled at the same time based on pitch angle data which are previously detected corresponding to an interval time. If an amount of a change in the pitch angle data for a stop position (a position of an optical axis) of the actuator is small, there is a possibility that the actuator of one of the headlamps might be driven and the actuator of the other headlamp might not be driven (autoleveling might function in one of the headlamps and might not function in the other headlamp).

This problem is investigated. As a result, it has been found that the problem arises due to a hysteresis of an actuator driving circuit.

Figure 6:
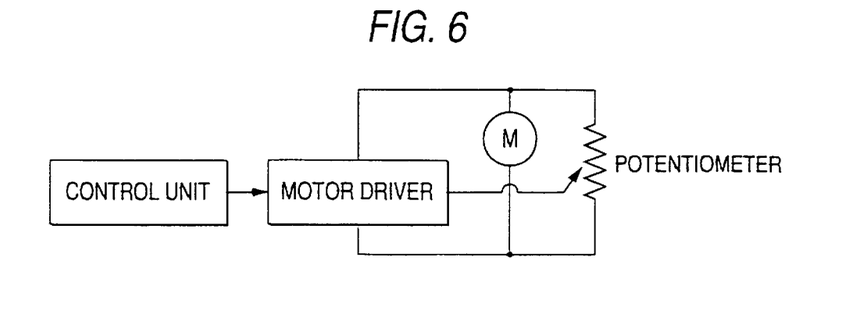
FIG. 6 is a diagram showing the structure of a motor driving section.
Figure 7:
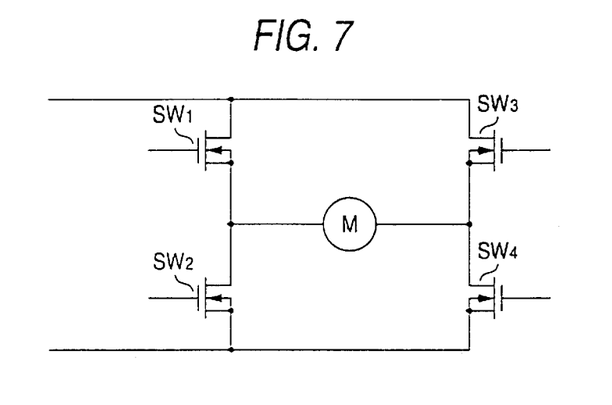
FIG. 7 is a diagram showing the structure of a main part of a motor driving circuit.

More specifically, a driving circuit using a DC motor M shown in FIG. 6 is used as an actuator mechanism for tilting a reflector. A motor driver serves to control driving (rotation) of the DC motor M which is an actuator body in response to a driving signal sent from a control unit, and a signal is fed back from a potentiometer which detects a rotating position of the motor M to the motor driver. In the motor driving circuit, a pair of switches Sw1 and Sw4 (or switches Sw2 and Sw3) are turned on to rotate the motor M and a pair of switches Sw1 and Sw3 on the Hi side (or switches Sw2 and Sw4) are turned on to brake and stop the motor when the potentiometer reaches a target position as shown in FIG. 7. Also after the motor is braked, it continuously rotates by inertia. Therefore, a hysteresis having predetermined widths of $H_1$ and $H_2$ shown in FIG. 8 is provided between the braking and operation of the motor such that the motor does not carry out a hunching operation.

Figure 8:
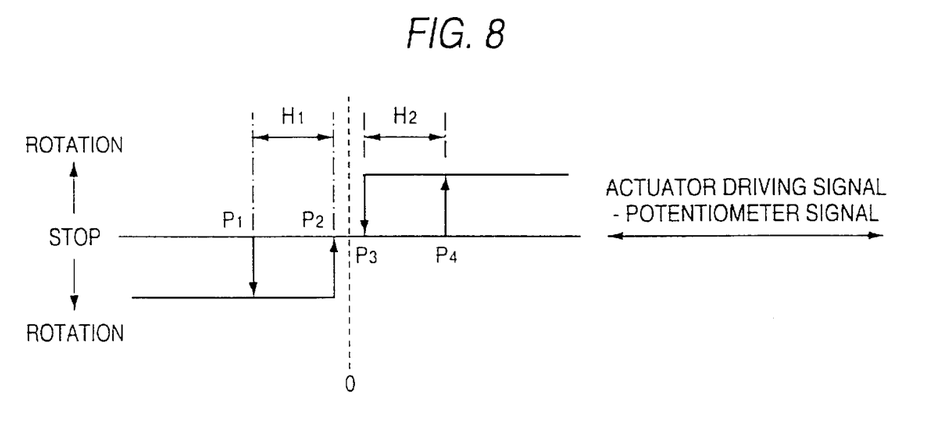
FIG. 8 is a diagram showing a hysteresis of the actuator driving circuit.

FIG. 8 shows a hysteresis in an actuator (motor) driving circuit. A feedback signal sent from the potentiometer indicates a current position of the actuator (motor). Therefore, a difference between an actuator driving signal and the feedback signal sent from the potentiometer indicates an operation position of the actuator. When the difference between the actuator driving signal and the feedback signal sent from the potentiometer (which will be hereinafter referred to as an actuator driving signal output) reaches almost 0 (a position indicated as the reference numeral P2 or P3 in FIG. 8), the actuator driving circuit is braked and stopped. When the actuator driving signal output is increased to be equal to or less than P1 or equal to or more than P4 in FIG. 6, the actuator (motor) is operated. Thus, the hysteresis is provided in the actuator driving circuit.

However, the actuator such as a motor is an industrial product. Therefore, a hysteresis range always has an error. The hysteresis widths of the respective actuator driving circuits of the left and right headlamps are not identical to each other. For this reason, if pitch angle data detected by pitch angle detecting means and pitch angle data used for the last driving control of the motor has a small difference when the motor is to be operated in the stop state, an actuator driving signal output corresponding to the pitch angle data gets out of the hysteresis range in the actuator driving circuit of one of the headlamps and gets in the hysteresis range in the actuator driving circuit of the other headlamp. In such a case, one of the actuators is driven and the other actuator is not driven. As a result, the autoleveling functions in one of the headlamps and does not function in the other headlamp. Consequently, the positions of the optical axes of the left and right headlamps make a difference.

SUMMARY OF THE INVENTION

The invention has been made in consideration of the problems of the conventional art and has an object to provide an autoleveling device of a headlamp for an automobile which can drive left and right actuators at the same time without influence of a hysteresis of an actuator driving circuit.

In order to achieve the object, a first aspect of the invention is directed to an autoleveling device of a headlamp for an automobile comprising a pair of left and right headlamps in which optical axes are tilted in a vertical direction with respect to a body by driving operations of respective actuators, single control means for controlling the driving operations of the actuators at the same time, vehicle speed detecting means for detecting a speed of a vehicle, pitch angle detecting means for detecting a pitch angle of the vehicle, and a storage section for storing pitch angle data of the vehicle which are detected by the pitch angle detecting means, the control means controlling the driving operation of the actuator such that the optical axes of the headlamps are set in a constant tilting state with respect to a road based on the pitch angle data detected by the pitch angle detecting means, wherein the control means drives the actuator if a difference between the pitch angle data detected by the pitch angle detecting means and the pitch angle data used for the last driving control of the actuator is more than a predetermined reference value which is equal to or more than a pitch angle equivalent to a hysteresis width of each of actuator driving circuits of the left and right headlamps, and does not drive the actuator if the difference is less than the reference value.

If the difference between the pitch angle data detected at the present time by the pitch angle detecting means and the pitch angle data used for the last actuator driving control is greater than the predetermined reference value which is equal to or greater than the pitch angle equivalent to the hysteresis width of each of the actuator driving circuits of the left and right headlamps, both actuators are driven. Contrary, if the difference is less than the predetermined reference value, the actuators are not driven. Therefore, there is no drawback that only one of the actuators is driven as in the conventional art.

Figure 4:
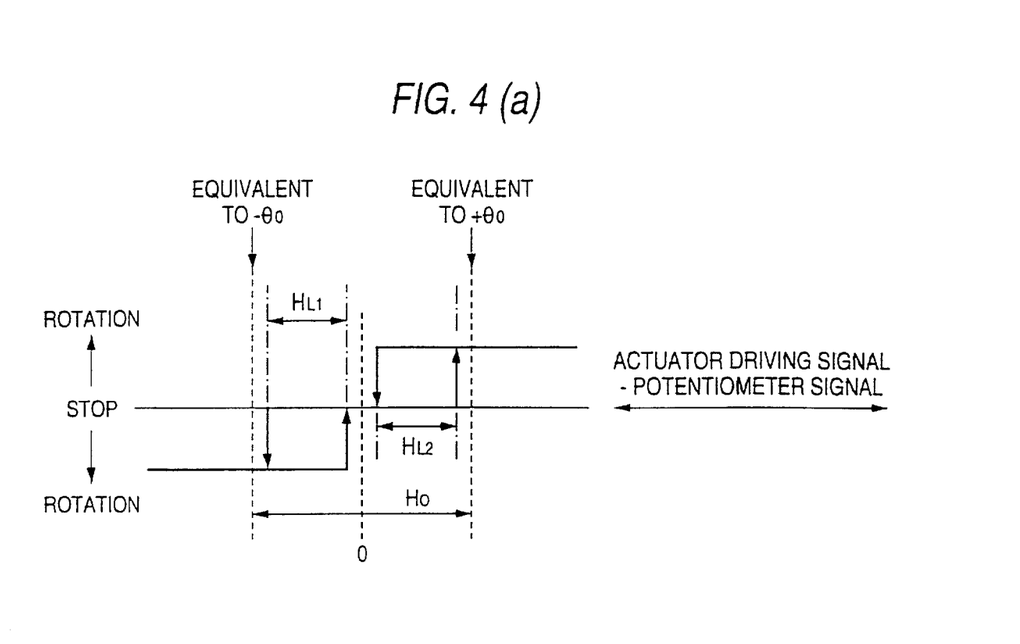
FIG. 4A shows a hysteresis of an actuator driving circuit of a left headlamp and a reference value to be a reference for driving an actuator and FIG. 4B shows a hysteresis of an actuator driving circuit of a right headlamp and a reference value to be a reference for driving the actuator.

The function of the control means will be described with reference to FIGS. 4A and 4B showing the hysteresis of each actuator driving circuit of the left and right headlamps.

In the actuator driving circuit of the left headlamp, hystereses $HL_1$ and $HL_2$ are present as shown in FIG. 4A. In the actuator driving circuit of the right headlamp, hystereses $HR_1$ and $HR_2$ are present as shown in FIG. 4B. A predetermined reference pitch angle θ0 which is equal to or more than a pitch angle equivalent to hysteresises HL and HR of the left and right actuator driving circuits is preset, to the control means, as a reference value to be a reference for driving the actuator. $H_o$ in FIGS. 4A and 4B represents a hysteresis width corresponding to a reference pitch angle θ0, and $H_0/2>HL_1(HL_2)$ and $H_0/2>HR_1(HR_2)$ are obtained.

The control means decides whether a difference |θ2−θ1| between pitch angle data θ2 newly detected by the pitch detecting means and pitch angle data θ1 used for the last control of the actuator is more than the predetermined reference pitch angle θ0. Only if the difference |θ2−θ1| is more than the predetermined reference pitch angle θ0 (|θ2−θ1|>θ0), both actuators are driven at the same time. Accordingly, there is no possibility that one of the actuators might be driven.

A second aspect of the invention is directed to the autoleveling device of a headlamp for an automobile according to the first aspect of the invention, wherein the control means controls the driving operation of the actuator at regular intervals based on the detected pitch angle data during stop and controls the driving operation of the actuator only once based on pitch angle data for stable running only during the stable running in which a vehicle speed having a predetermined value or more and an acceleration having a predetermined value or less are continuously maintained for a predetermined time.

Since the pitch angle data obtained during the stop of the vehicle have few disturbance factors for the detection, they are more accurate than the pitch angle data obtained during the running of the vehicle. The driving operation of the actuator is controlled based on the accurate pitch angle data. Therefore, the autoleveling can be carried out accurately.

Moreover, the driving operation of the actuator is controlled during the stop every constant time (interval time). Consequently, an operation frequency of the actuator is decreased, power consumption is reduced and driving mechanism components are less worn.

Furthermore, in the case in which the leveling (optical axis correction) based on the pitch angle data during the stable running in which a vehicle speed having a predetermined value or more and an acceleration having a predetermined value or less are continuously maintained for a predetermined time (data close to the pitch angle data obtained during the stop of the vehicle) properly corrects leveling (optical axis correction) based on the pitch angle data during the improper stop of the vehicle as in the case in which the vehicle is stopped on a slope or the vehicle is stopped while running onto a curb.

A third aspect of the invention is directed to the autoleveling device of a headlamp for an automobile according to the second aspect of the invention, wherein a driving interval of the actuator is longer than a maximum driving time of the actuator which is required for one leveling.

If the interval between the last control and the next control is shorter than the maximum driving time of the actuator, the actuator starts a next operation before reaching a target value. Consequently, the driving frequency of the actuator is increased so that the lifetime of the actuator might be reduced. After the actuator reliably reaches the target value through the last control, the actuator is driven through the next control. Therefore, the driving frequency of the actuator is decreased correspondingly so that the lifetime of the actuator can be prevented from being reduced.

By increasing the interval of the driving operation of the actuator, a change in the pitch angle in the interval from the last control to the next control can be omitted without the driving operation of the actuator. Therefore, all the operations between the intervals are aggregated into the driving operation of the actuator in the next control. Correspondingly, the driving frequency of the actuator is decreased.

Moreover, the pitch angle data of the vehicle which are detected by the pitch angle detecting means are always fetched into the control section and are calculated as a control volume also for a driving interval period of the actuator. By utilizing all the pitch angle data fetched into the control section as control data, more pitch angles can be used as the control data and it is possible to carry out proper leveling with the detection of an accurate posture (pitch angle) of the vehicle.

A fourth aspect of the invention is directed to the autoleveling device of a headlamp for an automobile according to the second or third aspect of the invention, wherein the control means controls the driving operation of the actuator based on vehicle pitch angle data detected before an accelerator is stepped on which are not influenced by a change in a posture of a vehicle during starting when the interval control is carried out almost simultaneously with the start of the vehicle.

The start of the vehicle is detected by the vehicle speed detecting means (vehicle speed sensor). In the case in which the interval control is carried out simultaneously with the start of the vehicle, the driving operation of the actuator might be controlled based on the improper pitch angle data. Therefore, the autoleveling can be carried out properly by correcting and controlling the driving operation of the actuator based on the proper pitch angle data obtained before the accelerator is stepped on.

Figure 3:
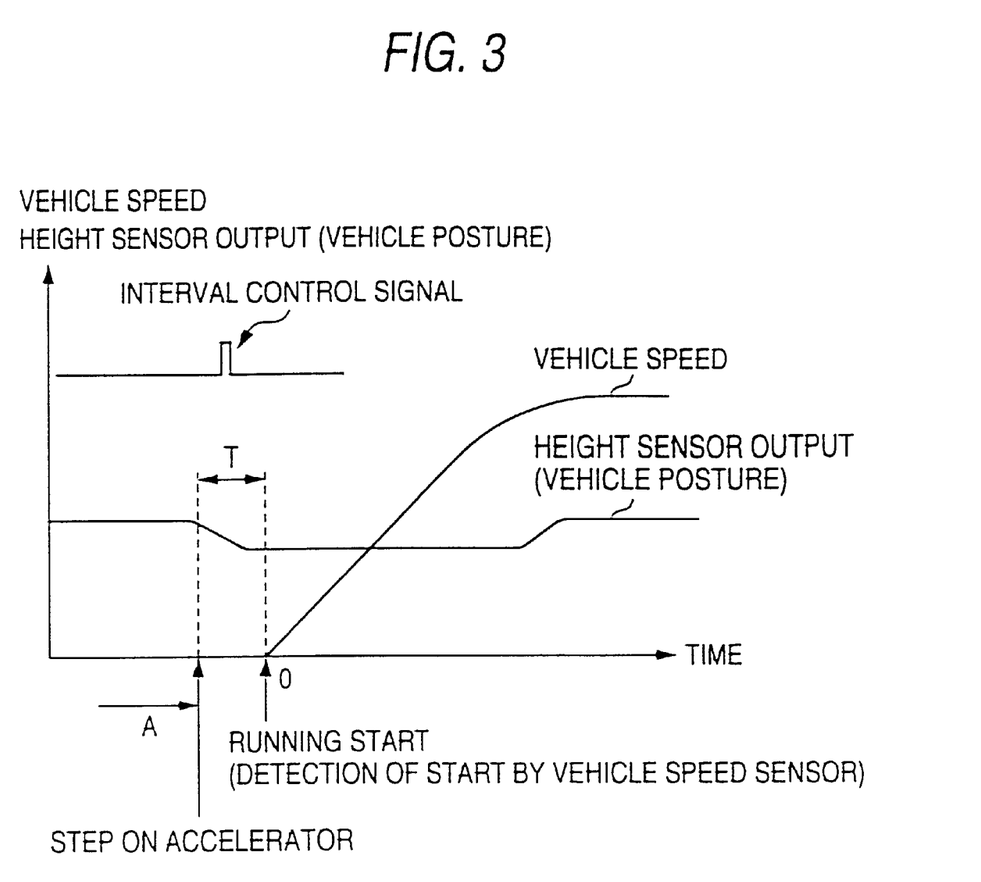
FIG. 3 is a chart showing a relationship between a change in a vehicle speed and a height sensor output (vehicle posture) which is obtained after an accelerator is stepped on until a vehicle starts to run and reaches constant-velocity running and an actuator driving control signal.

This respect will be described in detail with reference to FIG. 3. FIG. 3 is a chart showing a change in a vehicle speed and a vehicle posture until the vehicle starts to run and carries out constant-velocity running after the accelerator is stepped on.

As shown in FIG. 3, a predetermined time (T) is required while the accelerator is stepped and the vehicle then starts to run actually. In other words, the vehicle speed starts to be increased after the predetermined time (T) passes since the accelerator has been stepped on. For this reason, there is a predetermined start detection delay time T after the accelerator is stepped on until the vehicle speed sensor detects the start of the vehicle.

On the other hand, the acceleration rapidly acts on the vehicle posture when the accelerator is stepped on. Consequently, a rear portion of the vehicle once sinks. While the acceleration acts, this state (in which the rear portion of the vehicle sinks) is continuously maintained. More specifically, when the vehicle speed sensor detects the start of the vehicle (the control section detects the start of the vehicle based on the output of the vehicle speed sensor), the rear portion of the vehicle is maintained to sink (forward and upward).

Consequently, in the case in which the driving control of the actuator (for example, the interval control) is carried out almost simultaneously with the start of the vehicle (in the case in which there is a timing of the interval control within the vehicle start detection delay time T required after the accelerator is stepped on until the vehicle speed sensor detects the start of the vehicle), the pitch angle data used for the interval control are detected by the pitch angle detecting means in the timing of the interval control and might include data on the state in which the vehicle sinks when the running is started, which is not always appropriate. More specifically, there is a possibility that the driving operation (autoleveling) of the actuator based on improper pitch angle data might be carried out.

By using the pitch angle data during the stop which are detected before the time T (pitch angle data detected before the accelerator is stepped on which is indicated as the reference designation A in FIG. 3), the driving operation of the actuator is corrected and controlled. Consequently, it is possible to avoid the influence of a change in a vehicle posture during the start of the vehicle in the autoleveling of the headlamp.

Before the vehicle actually takes off after the accelerator is stepped on, 1 to 3 seconds are taken depending on the vehicle. For this reason, it is desirable that the vehicle start detection delay time should be set to 1 to 3 seconds. Moreover, in the case in which the start of the vehicle is detected within a preset time (set to 1 to 3 seconds) after the interval control (the driving control of the actuator), it can be decided that the interval control (the driving control of the actuator) is carried out almost simultaneously with the start of the vehicle. By setting the preset time within the vehicle start detection delay time (1 to 3 seconds), it is possible to easily decide whether or not the interval control is carried out almost simultaneously with the start of the vehicle (whether or not the timing of the interval control is coincident when the vehicle takes off).

A fifth aspect of the invention is directed to the autoleveling device of a headlamp for an automobile according to any of the first to fourth aspects of the invention, wherein the driving operation of the actuator is controlled on lighting conditions.

As long as the headlamp is not turned on, the actuator is not driven. Correspondingly, the number of the operations of the actuator can be decreased, power consumption can be reduced and driving mechanism components are less worn.

DETAILED DESCRIPTION OF THE PREFERRED EMBODIMENTS

An embodiment of the invention will be described below.

Figure 1:
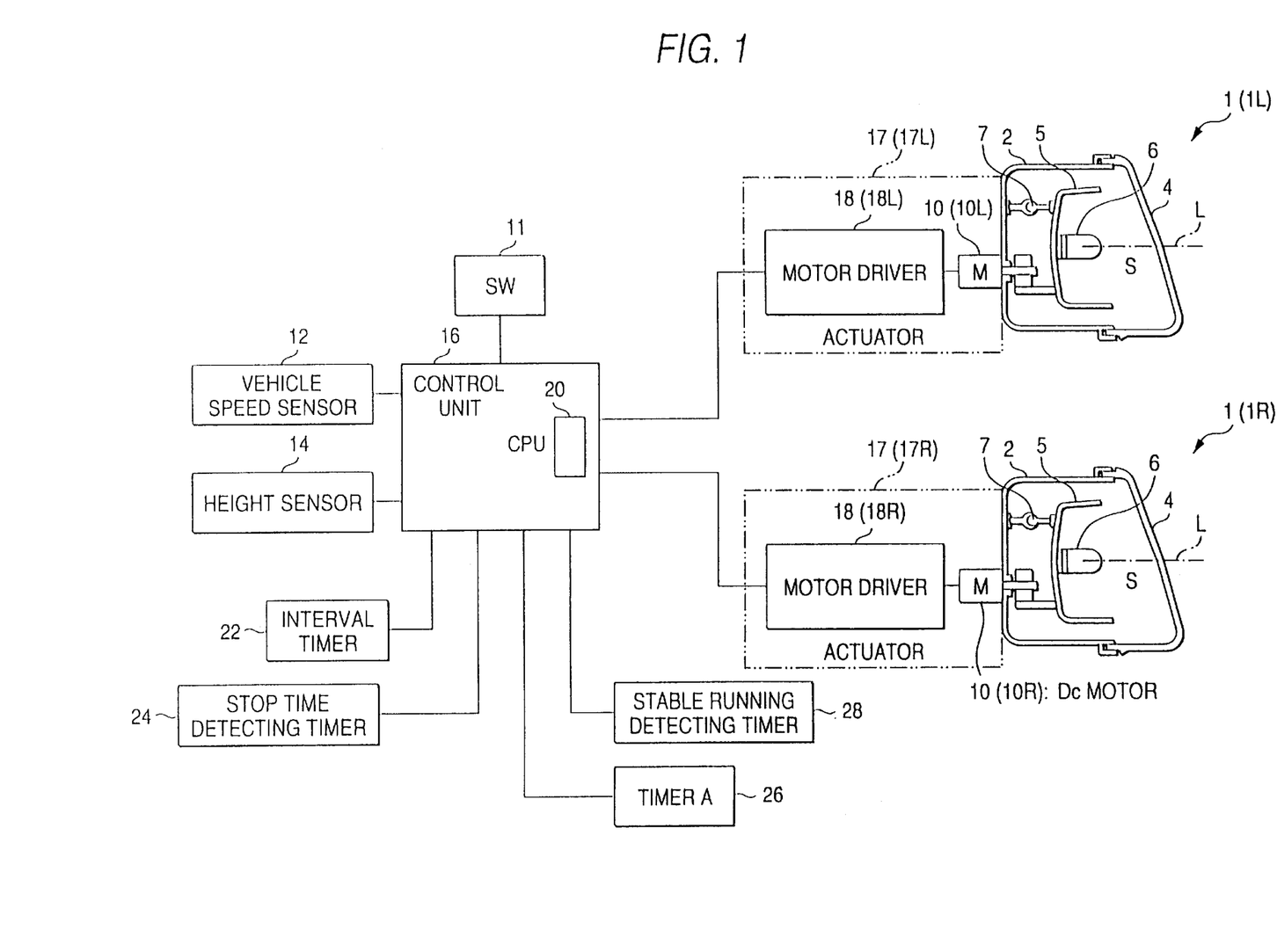
FIG. 1 is a diagram showing the whole structure of an autoleveling device of a headlamp for an automobile according to a first embodiment of the invention.
Figure 2:
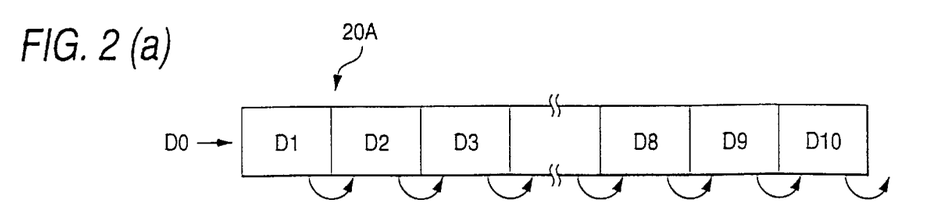
FIGS. 2A to 2D are diagrams showing a structure of a storage section.
Figure 5:
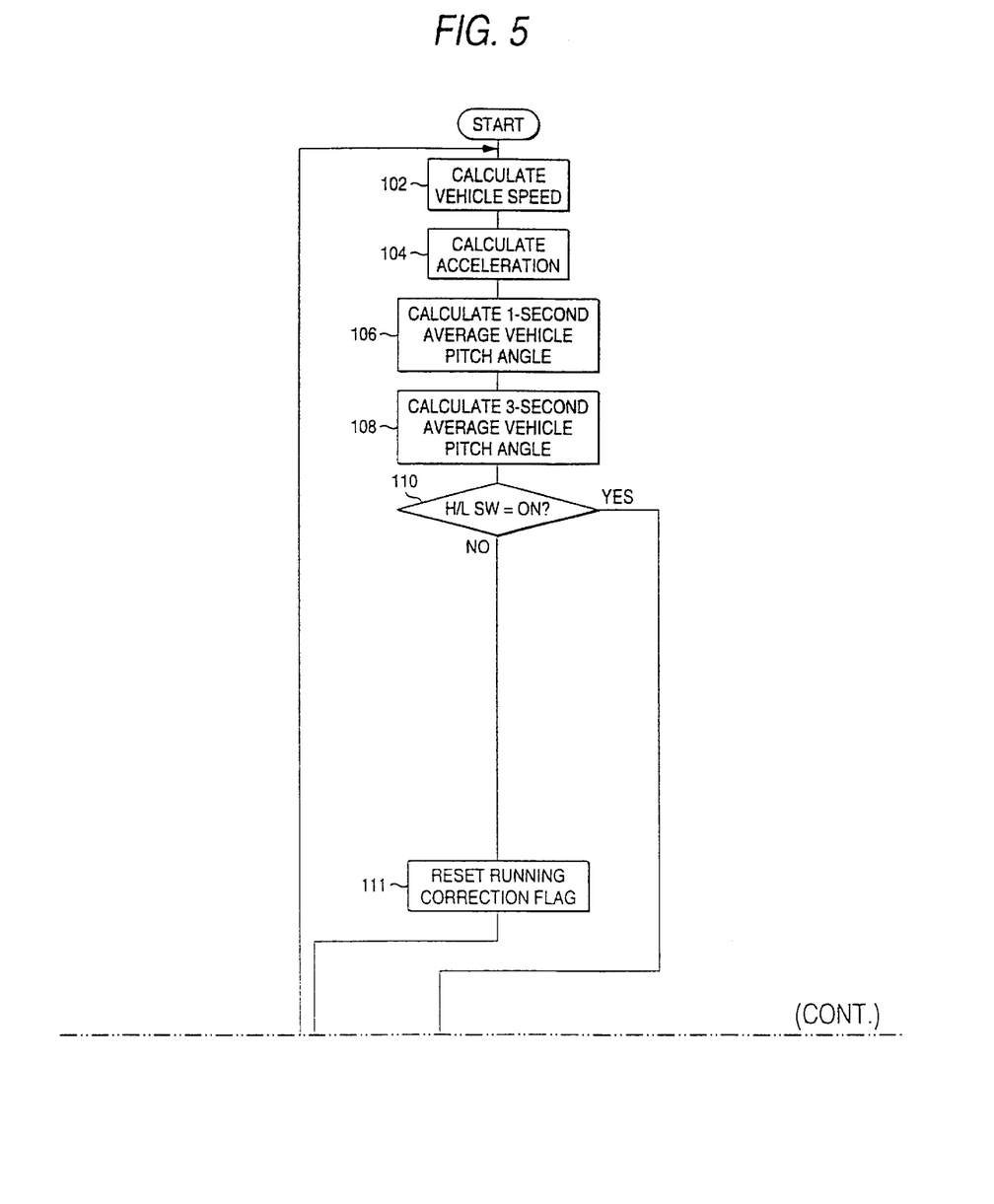
FIG. 5 is a flow chart showing a CPU acting as a control section of the device.

FIGS. 1 to 5 show an embodiment of the invention. FIG. 1 is a diagram showing the whole structure of an autoleveling device of a headlamp for an automobile according to a first embodiment of the invention, FIG. 2 is a diagram showing the structure of a storage section, FIG. 3 is a chart showing a relationship between a change in a vehicle speed and a height sensor output (vehicle posture) which is obtained after an accelerator is stepped on until a vehicle then starts to run and reaches constant-velocity running and an actuator driving control signal, FIG. 4($a$) shows a hysteresis of an actuator driving circuit of a left headlamp and a reference value to be a reference for driving an actuator, and FIG. 4($b$) shows a hysteresis of an actuator driving circuit of a right headlamp and a reference value to be a reference for driving the actuator. FIG. 5 is a flow chart showing a CPU acting as a control section of the leveling device.

The reference numeral 1 (1L, 1R) in FIG. 1 denotes a pair of left and right headlamps for an automobile which have the same structures, and a front lens 4 is incorporated in a front opening of a lamp body 2 so that a lighting room S is formed. A reflector 5 having a paraboloidal shape having a bulb 6 to be a light source inserted therein is supported to be tilted around a horizontal tilting shaft (a shaft perpendicular to a paper in FIG. 1) 7 in the lighting room S and the tilting can be adjusted by actuators 17 (17L, 17R) . The actuators 17 (17L, 17R) are constituted by DC motors 10 (10L, 10R) to be actuator bodies and motor drivers 18 (18L, 18R) for driving the motor 10 (10L, 10R).

The autoleveling device of the headlamp is mainly constituted by the actuators 17 (17L, 17R) for adjusting the tilting of optical axes L of the left and right headlamps 1 (1L, 1R) in a vertical direction respectively, a lighting switch 11 of the headlamps 1 (1L, 1R), a vehicle speed sensor 12 to be vehicle speed detecting means for detecting a speed of a vehicle, a height sensor 14 constituting a part of pitch angle detecting means of the vehicle, a CPU 16 to be a control unit for deciding lighting and lighting-out of the headlamp, deciding the running and stop state of the vehicle based on a signal sent from the vehicle speed sensor 12, calculating an acceleration, and calculating a pitch angle of the vehicle based on a signal sent from the height sensor 14 and outputting, to the motor driver 18, a control signal for driving the motor 10 based on pitch angle data, a storage section 20 for storing the pitch angle data of the vehicle which are detected by the height sensor 14 and calculated in the CPU 16, an interval timer 22 for setting a timing for driving the motor 10, a stop time detecting timer 24 for detecting the stop time of the vehicle, a timer A26 for detecting a time required after interval control is carried out until the vehicle starts to run actually, and a stable running time detecting timer 28 for detecting a stable running time of the vehicle.

When a signal is input from the vehicle speed sensor 12 in the CPU 16, it is decided based on the input signal whether the vehicle is being stopped or running. Only in the case in which the driving operation of the motor 10 is controlled at regular intervals during the stop and stable running conditions are satisfied during the running, the driving operation of the motor 10 is controlled only once.

Moreover, when a signal is input from the height sensor 14 in the CPU 16, an inclination (a pitch angle) in a longitudinal direction of the vehicle is calculated based on the signal corresponding to a displacement of a suspension. In the vehicle according to the embodiment, a 1-sensor method in which the height sensor 14 is provided only on the right wheel side of the suspension on the rear wheel side is employed, and the pitch angle of the vehicle can be guessed based on the displacement of a height detected by the height sensor 14. The CPU 16 outputs a signal to the motor driver 18 to tilt the optical axis L by a predetermined amount in such a direction as to cancel the pitch angle thus detected.

Moreover, the storage section 20 serves to store the pitch angle data detected by the height sensor 14 and calculated in the CPU 16. A shown in FIG. 2A, 10 data D1 to D10 sampled for one second at an interval of 100 ms are stored in a storage section 20A of the storage section 20. Furthermore, 30 data D1 to D30 sampled for three seconds at an interval of 100 ms are stored in a storage section 20B of the storage section 20. New data are fetched into the storage sections 20A and 20B every 100 ms respectively and the oldest data are discarded (old data are sequentially rewritten by new data).

As shown in FIG. 2C, the storage section 20 includes a current pitch angle storage section 20C for storing current pitch angle data, a 1-second before pitch angle storage section 20D for storing pitch angle data obtained 1 second before, a 2-second before pitch angle storage section 20E for storing a pitch angle obtained 2 seconds before, and a 3-second before pitch angle storage section 20F for storing pitch angle data obtained 3 seconds before. Every time one second passes, 1-second average pitch angle data detected newly are written to the current pitch angle storage section 20C, the current pitch angle data stored in the current pitch angle storage section 20C are shifted to the 1-second before pitch angle storage section 20D, the 1-second before pitch angle data stored in the 1-second before pitch angle storage section 20D are shifted to the 2-second before pitch angle storage section 20E, and the 2-second before pitch angle data stored in the 2-second before pitch angle storage section 20E are shifted to the 3-second before pitch angle storage section 20F respectively, and the old 3-second before pitch angle data stored in the 3-second before pitch angle storage section 20F are erased.

As shown in FIG. 2D, moreover, the storage section 20 includes a last data storage section 20G for storing pitch angle data used for the driving control of the actuator (motor). Every time the driving control of the actuator (motor) is newly carried out, last data $\theta_1$ stored in the last data storage section 20G are rewritten by pitch angle data $\theta_2$ used for the driving control of a current actuator (motor).

Furthermore, the CPU 16 decides whether the lighting switch 11 is ON or OFF, and outputs a signal to the motor driver 18 to drive the motor 10 only if the lighting switch 11 is ON.

Moreover, only if a predetermined interval time set in the interval timer 22 passes during the stop, the CPU 16 outputs a signal to the motor driver 18 to drive the motor 10.

More specifically, a tiltable range of the optical axes of the head lamps 1 (1L, 1R) is determined. Accordingly, a maximum driving time of the motor 10 which is required for one leveling is also determined. If an interval time of the motor driving operation is shorter than the maximum driving time of the motor 10 which is required for one leveling, the motor 10 is often driven successively according to a change in a vehicle posture (pitch angle) with people getting in and off. Consequently, normal rotation, reverse rotation and stop are repeated without the optical axis L (motor 10) reaching a target position so that a lifetime is reduced, which is not preferable.

The interval of the motor driving operation is set to a longer time (for example, 10 seconds) than the maximum driving time of the motor 10 which is required for one leveling. Consequently, the target position of the optical axis is not changed during the leveling operation (the driving operation of the motor).

Moreover, the CPU 16 controls the driving operation of the motor 10 based on the newest 1-second avarage pitch angle data (average values of the data D1 to D10) stored in the storage section 20 (storage section 20A) during the stop. In the case in which a timing of the interval control is almost coincident at the time of the start of the vehicle, there is a high possibility that the driving operation of the actuator might be controlled based on improper pitch angle data influenced by a change in the vehicle posture at the time of starting. Therefore, the driving operation of the motor 10 is controlled based on accurate pitch angle data before starting during the stop (pitch angle data during the stop which are stored in the storage section 20) in place of the improper pitch angle data.

As shown in FIG. 3, the pitch angle data detected within a time (start detection delay time) T required after the accelerator is stepped on until the vehicle speed sensor detects the start of the vehicle are not always accurate because the vehicle sinks. For this reason, in the case in which the interval control is carried out for the start detection delay time T (3 seconds) (the timing of the interval control is set), the control is carried out based on the improper pitch angle data in a state in which a rear portion of the vehicle sinks.

The time (start detection delay time) T required for causing the vehicle speed sensor 12 to detect the starting of the vehicle depends on a type of an automobile, and is generally 1 to 3 seconds and is not more than 3 seconds. In the embodiment, the start detection delay time T is set to 3 seconds and it is decided that the control is carried out based on the improper pitch angle data if the vehicle speed sensor 12 detects the starting of the vehicle within 3 seconds after the interval control is carried out. In this case, the driving operation of the motor 10 is corrected and controlled by using proper pitch angle data (3-second before pitch angle data) detected during the stop before the starting (see the reference designation A in FIG. 3) and stored in the storage section 20F of the storage section 20.

After the interval control is carried out, a time required for causing the vehicle speed sensor 12 to detect the starting of the vehicle is detected by the timer A26.

Moreover, the CPU 16 controls the driving operation of the motor 10 based on the newest 1-second avarage pitch angle data detected by the height sensor 14 during the stop. However, the leveling (optical axis correction) is sometimes carried out based on the pitch angle data during the improper stop of the vehicle as in the case in which the vehicle is stopped on a slope or the case in which the vehicle is stopped while running onto a curb. Only during stable running, the driving operation of the motor 10 is controlled based on the pitch angle data detected during the stable running, thereby correcting the erroneous leveling (optical axis correction) only once. If the pitch angle data during the stop of the vehicle are proper (in the case in which the vehicle is not stopped in such an unnatural form that the vehicle is stopped on a slope or runs onto a curb), the pitch angle data obtained during the stable running are almost equal to the pitch angle data during the stop of the vehicle. Accordingly, the position of the optical axis which is set after the leveling based on the pitch angle data during the stable running is almost equal to the position of the optical axis which is set after the final leveling carried out during the stop of the vehicle.

Furthermore, the CPU 16 always detects a signal sent from the height sensor 14 and carries out an operation in a comparatively short sampling time (100 ms), thereby calculating 1-second avarage pitch angle data and 3-second avarage data. The CPU 16 controls the driving operation of the motor 10 based on the 1-second avarage pitch angle data every interval time of 10 seconds during the stop and controls the driving operation of the motor 10 only in the case in which a vehicle speed is equal to or more than a reference value, an acceleration is equal to or less than a reference value and this state (in which the vehicle speed is equal to or more than the reference value and the acceleration is equal to or less than the reference value) is continuously maintained for a constant time or more in order to eliminate a disturbance during running.

In a rough road having a large number of elements to cause a disturbance such as bumps of the road, the vehicle cannot run at a speed of 30 km/h or more. In order to eliminate rapid acceleration and deceleration with which the posture of the vehicle is changed, it is proper that the acceleration should be limited to 0.78 m/s$^2$ or less. Accordingly, the condition for the stable running is that a speed of 30 km/h or more and an acceleration of 0.78 m/s$^2$ or less are continuously maintained for 3 seconds or more. Only when the condition is satisfied, an unexpected abnormal value is detected with difficulty and has less influence by the calculation of the pitch angle of the vehicle. Whether the stable running state is continuously maintained for 3 seconds or more is decided by causing the CPU 16 to count the stable running time detecting timer 28 for operating when a speed of 30 km/h or more and an acceleration of 0.78 m/s$^2$ or less are confirmed.

Moreover, the CPU 16 is constituted such that both actuators are driven if a difference between the pitch angle data calculated based on the signal sent from the height sensor 14 and the pitch angle data used for the last driving control of the actuator is more than a predetermined reference value which is equal to or more than a pitch angle equivalent to hysteresis widths of the respective actuator driving circuits of a pair of left and right headlamps and that both actuators are not driven if the same difference is less than the predetermined reference value.

The action of the CPU 16 will be described with reference to FIGS. 4A and 4B. FIG. 4A shows a hysteresis of the actuator driving circuit of the left headlamp and a reference value to be a reference for driving the actuator, and FIG. 4B shows a hysteresis of the actuator driving circuit of the right headlamp and a reference value to be a reference for driving the actuator.

In the actuator driving circuit of the left headlamp, hysteresises $HL_1$ and $HL_2$ are present. In the actuator driving circuit of the right headlamp, the hysteresises $HR_1$ and $HR_2$ are present. A predetermined reference pitch angle $\theta 0$ which is equal to or more than a pitch angle equivalent to the hysteresises $HL_1(HL_2)$ and $HR_1(HL_2)$ of the left and right actuator driving circuits is preset, to the CPU 16, as a reference value to be a reference for driving the actuator. $H_0/2$ in FIGS. 4A and 4B represents a hysteresis width corresponding to the reference pitch angle $\theta 0$, and $H_0/2>HL_1(HL_2)$ and $H_0/2>HR_1(HR_2)$ are obtained.

The CPU 16 decides whether or not a difference $|\theta 2-\theta 1|$ between pitch angle data $\theta 2$ newly detected by the height sensor 14 and pitch angle data $\theta 1$ used for the last control of the actuator is more than the predetermined reference pitch angle $\theta 0$. If the difference $|\theta 2-\theta 1|$ is more than the predetermined reference pitch angle $\theta 0$ ($|\theta 2-\theta 1|>\theta 0$), both actuator (motors 10L and 10R) are driven at the same time. If the difference $|\theta 2-\theta 1|$ is not more than the predetermined reference pitch angle $\theta 0$ ($|2-\theta 1|\leq \theta 0$), both actuator (motors 10L and 10R) are not driven.

Next, the control of the driving operation of the motor 10 which is carried out by the CPU 16 to be the control unit will be described with reference to a flow chart of FIG. 5.

At Steps 102 and 104, first of all, a vehicle speed and an acceleration are calculated from the output of the vehicle speed sensor 12, respectively. At Steps 106 and 108, 1-second average pitch angle data and 3-second average pitch angle data are calculated from the output of the height sensor 14, respectively. At Step 110, it is decided whether the headlamp is turned on or not in response to an output sent from the lighting switch 11. If YES (lighting), the processing proceeds to Step 112. If NO (lighting off), a running correction flag is reset at Step 111 and the processing returns to the Step 102.

At the Step 112, it is decided whether the vehicle is changed from the stop to the start state. More specifically, it is decided whether the vehicle is changed from the stop to the running in response to the output sent from the vehicle sensor 12.

If NO (stop or running) at the Step 112, it is decided whether the vehicle is running or not at Step 114. At the Step 114, if NO (stop), the running correction flag is reset at Step 115. More specifically, in the case in which the driving control of the motor is carried out (the optical axis is corrected) based on the pitch angle data during the stable running, the running correction flag is set at Step 137 which will be described below. Then, if the vehicle is stopped, the running correction flag is reset at the Step 115.

The processing proceeds to Step 116 where it is decided whether or not one second passes after the stop by means of a stop time detecting timer 24. If YES (one second passes), the 2-second before pitch angle data stored in the 2-second before pitch angle storage section 20E of the storage section 20 are shifted to the 3-second before pitch angle storage section 20F at Step 161. At Step 162, the 1-second before pitch angle stored in the 1-second before pitch angle storage section 20D is shifted to the 2-second before pitch angle storage section 20E. At Step 163, a current pitch angle stored in the current pitch angle storage section 20C is shifted to the 1-second before pitch angle storage section 20D. At Step 164, the 1-second average pitch angle thus detected is written to the current pitch angle storage section 20C and the processing then proceeds to Step 117.

At the Step 116, if NO (one second does not pass after the stop), the processing directly proceeds to the Step 117 without passing through the Steps 161 to 164. At the Step 117, then, it is decided by the interval timer 22 whether an interval time (10 seconds) passes or not. If YES (10 seconds pass) at the Step 117, a timer A26 is reset (the timer A26 for detecting a time required after the interval control until the starting of the vehicle is detected is cleared) at Step 118A. At Step 118C, it is decided whether or not a difference between the 1-second average pitch angle data thus detected and the pitch angle data used for the last interval control (the pitch angle data stored in the last control data storage section 20G of the storage section 20) is more than a reference value. If YES (the difference is more than the reference value), the 1-second average pitch angle data stored in the current data storage section 20C of the storage section 20 are selected at Step 119. At Step 119A, the pitch angle data selected at the Step 119 are stored in the last control data storage section 20G and the processing then proceeds to Step 120 where an output is sent to the motor driver 18 to drive the motor 10 based on the 1-seond average pitch angle data thus selected. Thereafter, the processing returns to the Step 102. At the Step 118C, if NO, nothing is executed and the processing returns to the Step 102. In other words, if there is a possibility that one of the actuators might be driven, the autoleveling does not function.

At the Step 117, if NO (10 seconds do not pass), the timer A26 is counted up at Step 118B and the processing then returns to the Step 102 without driving the motor 10.

At the Step 114, if YES (running), the timer A26 is reset at Step 128 and the processing then proceeds to Step 130. At the Step 130, it is decided whether the running correction flag is set or not (whether the optical axis is corrected or not during the running, that is, whether the leveling is carried out or not). If NO, that is, the running correction flag is not set (the optical axis is not corrected during the running, that is, the leveling is not carried out), it is decided whether or not the vehicle speed is equal to or more than a reference value (30 km/h) at Step 131. If YES (30 km/h or more), it is decided whether or not the acceleration is equal to or less than a reference value (0.78 m/s$^2$) at Step 132. If YES (0.78 m/s$^2$ or less) at the Step 132, the stable running time detecting timer 28 is counted up at Step 133. At Step 134, it is decided whether a vehicle speed of 30 km/h or more and an acceleration of 0.78 m/s$^2$ or less are continuously maintained for a predetermined time (3 seconds) or more.

If YES (in the case in which a vehicle speed of 30 km/h or more and an acceleration of 0.78 m/s$^2$ or less are continuously maintained for three seconds or more) at the Step 134, the processing proceeds to Step 135 where the stable running time detecting timer 28 is reset. Then, the processing proceeds to Step 137.

At the Step 137, the running correction flag is set and the processing proceeds to Step 137A where it is decided whether or not a difference between the three-second average pitch angle data thus detected and the pitch angle data used for the last interval control (the pitch angle data stored in the last control data storage section 20G of the storage section 20) is more than a reference value. If YES, the 3-second average pitch angle data stored in the storage section 20B of the storage section 20 are selected at Step 138. The pitch angle data selected at the Step 138 are stored in the last control data storage section 20G at the Step 119A. Then, the processing proceeds to the Step 120 where an output is sent to the motor driver 18 to drive the motor 10 based on the three-second average pitch angle data thus selected. Thereafter, the processing returns to the Step 102.

If NO at Step 137A, nothing is executed and the processing then returns to the Step 102.

If YES, that is, the running correction flag is set (the optical axis is corrected, that is, the leveling is carried out during running) at the Step 130 or if NO (the vehicle speed is less then the reference value of 30 km/h and the acceleration is more than the reference value of 0.78 m/s$^2$) at the Steps 131 and 132, the count of the stable running time detecting timer 28 is cleared at Step 139. Then, the processing returns to the Step 102.

If NO (the vehicle speed is equal to or more than the reference value of 30 km/h, the acceleration is equal to or less than the reference value of 0.78 m/s$^2$ and they are not continuously maintained for 3 seconds or more) at the Step 134, the motor 10 is not driven and the processing returns to the Step 102.

If YES (the stop is changed into the running, that is, the vehicle takes off) at the Step 112, it is decided by the stop time detecting timer 24 whether or not the stop is maintained for 3 seconds (equal to the start detection delay time of the vehicle speed sensor 12) or less. If YES (a time required from the stop to the start is 3 seconds or less) at the Step 121, the time required from the stop to the start does not exceed the start detection delay time (3 seconds) of the vehicle speed sensor and there are no vehicle pitch angle data which are not influenced by the sinking of the vehicle before the accelerator is stepped on. Therefore, the actuator is not driven and the processing returns to the Step 102.

If NO (the time required from the stop to the start is seconds or more) at the Step 121, the time required from the stop to the start exceeds the start detection delay time (3 seconds) of the vehicle speed sensor and there are vehicle pitch angle data which are not influenced by the sinking of the vehicle before the accelerator is stepped on. In this case (NO), the processing proceeds to Step 122 where it is decided by the stop time detecting timer 24 whether or not the stop time is equal to or more than the interval time (10 seconds) . If NO (the stop time is less than 10 seconds) at the Step 122, the processing proceeds to Step 123 where it is decided whether or not a difference between the three-second before pitch angle data thus detected and the pitch angle data used for the last interval control (the pitch angle data stored in the last control data storage section 20G of the storage section 20) is more than a reference value. If YES (the difference is more than the reference value), the 3-second before pitch angle data stored in the storage section 20F of the storage section 20 are selected at Step 124. The three-second before pitch angle data selected at the Step 124 are stored in the last control data storage section 20G at the Step 119A. Then, the processing proceeds to the Step 120 where an output is sent to the motor driver 18 to drive the motor 10 based on the three-second average pitch angle data thus selected. Thereafter, the processing returns to the Step 102. If NO at the Step 123, nothing is executed and the processing then returns to the Step 102.

If YES (the stop time is 10 seconds or more) at the Step 122, the processing proceeds to Step 126 where it is decided whether or not the timer A26 is 3 seconds or less, that is, a time required for the vehicle speed sensor 12 to detect the start of the vehicle after a timing in which the actuator is driven is the start detection delay time (3 seconds) of the vehicle speed sensor or less. If YES (the timer A26 is 3 seconds or less and there is a possibility that improper pitch angle data obtained by the sinking of the vehicle might be detected by the height sensor and be stored in the storage section) at the Step 126, the processing proceeds to Step 127 where it is decided whether or not the difference between the three-second average pitch angle data thus detected and the pitch angle data used for the last interval control (the pitch angle data stored in the last control data storage section 20G of the storage section 20) is more than the reference value. If YES (the difference is more than the reference value), the three-second before pitch angle data stored in the storage section 20F of the storage section 20 are selected at Step 128A. At the Step 119A, then, the pitch angle data selected at the Step 138 are stored in the last control data storage section 20G. Thereafter, the processing proceeds to the Step 120 where an output is sent to the motor driver 18 to drive the motor 10 based on the three-second before pitch angle data thus selected and the processing returns to the Step 102. If NO at the Steps 126 and 127, nothing is executed and the processing returns to the Step 102. If NO at the Step 126, there are no proper pitch angle data before the accelerator is stepped on. If NO at the Step 127, there is a possibility that only one of the actuators might be driven.

While the interval (time) of the actuator (motor) is 10 seconds in the embodiment, it is not restricted to the 10 seconds but may be optionally set for the maximum driving time of the actuator (motor).

In the embodiment, the stable running has the condition that a speed is set to 30 km/h or more, an acceleration is set to 0.78 m/s$^2$ or less and they are continuously maintained for 3 seconds, which are not restricted.

While there has been described the autoleveling in a reflector moving type headlamp provided with the reflector 5 which can be tilted with respect to the lamp body 2 fixed to the body in the embodiment, the invention can also be applied to autoleveling in a unit moving type headlamp provided with a lamp body reflector unit which can be tilted with respect to a lamp housing fixed to the body.

While the driving operation of the actuator is controlled at regular intervals in the embodiment, it is apparent that the invention can also be applied to the driving operation of the actuator which does not employ the interval control.

As is apparent from the above description, according to the autoleveling device of a headlamp for an automobile in accordance with the first aspect of the invention, there is no drawback that only one of the actuators is driven, and both actuators are always driven at the same time. Therefore, the optical axes of the left and right headlamps are always held in the same positions in a vertical direction. Consequently, a constant visibility can be guaranteed.

According to the second aspect of the invention, the driving operation of the actuator through the autoleveling is limited every constant time (interval time) during the stop. Therefore, the number of operations of the actuators can be decreased, power consumption can be reduced and the driving mechanism components are less worn. Consequently, it is possible to provide an inexpensive autoleveling device which is operated accurately.

During the running, moreover, the leveling is carried out based on the pitch angle for the stable running. Therefore, the autoleveling based on an erroneous pitch angle during the stop is corrected. Thus, it is possible to provide an autoleveling device which is operated accurately.

According to the third aspect of the invention, the driving frequency of the actuator is reduced. Therefore, it is possible to provide an autoleveling device which is operated accurately for a long period of time.

According to the fourth aspect of the invention, even if the timing of the interval control is coincident at the time of start, the driving operation of the actuator is corrected and controlled based on proper pitch angle data detected during the stop. Therefore, the proper autoleveling can always be guaranteed during the stop including the start.

According to the fifth aspect of the invention, the actuator is not driven as long as the headlamp is not turned on. Correspondingly, the number of the operations of the actuator can be decreased, power consumption can be reduced and the driving mechanism components are less worn. Consequently, it is possible to provide an inexpensive autoleveling device which is operated accurately.

What is claimed is:

1. An autoleveling device of a headlamp for an automobile comprising:

a pair of left and right headlamps in which optical axes are tiltable in a vertical direction with respect to a body by driving operations of respective actuators;

single control means for controlling the driving operations of the actuators at the same time;

vehicle speed detecting means for detecting a speed of a vehicle;

pitch angle detecting means for detecting a pitch angle of the vehicle, and a storage section for storing pitch angle data of the vehicle which are detected by the pitch angle detecting means, wherein said control means controlling the driving operation of the actuator such that the optical axes of the headlamps are set in a constant tilting state with respect to a road based on the pitch angle data detected by the pitch angle detecting means, and said control means drives the actuator if a difference between the pitch angle data detected by the pitch angle detecting means and the pitch angle data used for the last driving control of the actuator is more than a predetermined reference value which is equal to or more than a pitch angle equivalent to a hysteresis width of each of actuator driving circuits of the left and right headlamps, and does not drive the actuator if the difference is equal to or less than the reference value.

2. The autoleveling device of a headlamp for an automobile according to claim 1, wherein the control means controls the driving operation of the actuator at regular intervals based on the detected pitch angle data during stop and controls the driving operation of the actuator only once based on pitch angle data for stable running only during the stable running in which a vehicle speed having a predetermined value or more and an acceleration having a predetermined value or less are continuously maintained for a predetermined time.

3. The autoleveling device of a headlamp for an automobile according to claim 2 wherein a driving interval of the actuator is longer than a maximum driving time of the actuator which is required for one leveling.

4. The autoleveling device of a headlamp for an automobile according to claim 2, wherein the control means controls the driving operation of the actuator based on vehicle pitch angle data detected before an accelerator is stepped on which is not influenced by a change in a posture of a vehicle during start when an interval control is carried out almost simultaneously with the start of the vehicle.

5. The autoleveling device of a headlamp for an automobile according to claim 3, wherein the control means controls the driving operation of the actuator based on vehicle pitch angle data detected before an accelerator is stepped on which is not influenced by a change in a posture of a vehicle during start when an interval control is carried out almost simultaneously with the start of the vehicle.

6. The autoleveling device of a headlamp for an automobile according to claim 1, wherein the driving operation of the actuator is controlled on lighting conditions.

* * * * *